United States Patent
Hiscock et al.

(10) Patent No.: US 10,499,363 B1
(45) Date of Patent: Dec. 3, 2019

(54) METHODS AND APPARATUS FOR IMPROVED ACCURACY AND POSITIONING ESTIMATES

(71) Applicant: QUALCOMM Incorporated, San Diego, CA (US)

(72) Inventors: Paul Dominic Hiscock, Cambridge (GB); Thomas Allan, St. Neots (GB); Murray Jarvis, Cambridge (GB); Nicolas Graube, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/134,930

(22) Filed: Sep. 18, 2018

(51) Int. Cl.
*H04B 7/08* (2006.01)
*A63F 13/00* (2014.01)
*G01S 1/30* (2006.01)
*H04W 64/00* (2009.01)
*H04W 4/80* (2018.01)
*G01S 13/76* (2006.01)
*H01Q 3/36* (2006.01)
*H04W 56/00* (2009.01)
*H04B 17/27* (2015.01)

(52) U.S. Cl.
CPC ......... *H04W 64/006* (2013.01); *G01S 13/767* (2013.01); *H01Q 3/36* (2013.01); *H04B 17/27* (2015.01); *H04W 4/80* (2018.02); *H04W 56/0035* (2013.01)

(58) Field of Classification Search
None
See application file for complete search history.

(56) References Cited

U.S. PATENT DOCUMENTS

| | | | | |
|---|---|---|---|---|
| 5,533,045 A * | 7/1996 | Hasegawa | ............... | H04B 1/707 375/141 |
| 6,748,008 B2 * | 6/2004 | Mesecher | ............... | G01S 5/12 375/145 |
| 7,714,773 B2 * | 5/2010 | Ozaki | ............... | G01S 13/84 340/539.21 |
| 8,050,288 B2 * | 11/2011 | Kapoor | ............... | H01Q 1/246 370/252 |
| 8,188,908 B2 | 5/2012 | Landt | | |
| 8,289,212 B2 * | 10/2012 | Rofougaran | ............... | A63F 13/235 342/458 |
| 8,451,720 B2 * | 5/2013 | Mihota | ............... | H04B 7/0697 370/229 |
| 8,456,362 B2 * | 6/2013 | Izumi | ............... | H04B 7/086 342/442 |
| 8,687,725 B2 * | 4/2014 | Mihoto | ............... | H04B 7/04 375/267 |
| 9,210,682 B2 | 12/2015 | Garin et al. | | |

(Continued)

*Primary Examiner* — Tuan A Tran
(74) *Attorney, Agent, or Firm* — Muncy, Geissler, Olds & Lowe, P.C./Qualcomm

(57) ABSTRACT

Disclosed are systems, devices and methods for determining a range estimate between two Bluetooth enabled devices based, at least in part, on round trip phase measurements of wireless signals transmitted between the devices. In one example, phase estimates between a single antenna of a first device and each element within the antenna array of a second device may be used to determine a residual range between the first device and the second device. In addition, an Angle of Arrival (AoA) may also be used to determine a two dimensional or three dimensional position of the second device.

14 Claims, 9 Drawing Sheets

(56) References Cited

U.S. PATENT DOCUMENTS

| | | |
|---|---|---|
| 9,813,867 B2 | 11/2017 | Prevatt et al. |
| 9,829,574 B2 * | 11/2017 | Taylor, Jr. ............... G01S 11/08 |
| 2011/0312421 A1 * | 12/2011 | Rofougaran .......... A63F 13/235 |
| | | 463/40 |
| 2015/0346349 A1 * | 12/2015 | Taylor, Jr. ............... G01S 11/08 |
| | | 342/357.24 |
| 2016/0209505 A1 * | 7/2016 | Kluge ..................... G01S 13/84 |
| 2018/0077589 A1 | 3/2018 | Jarvis et al. |
| 2018/0306911 A1 * | 10/2018 | Pernst .................... G01S 7/354 |

\* cited by examiner

METHODS AND APPARATUS FOR IMPROVED ACCURACY AND POSITIONING ESTIMATES

FIELD OF DISCLOSURE

This disclosure relates generally to phase measurements, and more specifically, but not exclusively, to range estimates between two transmitters based on phase measurements.

BACKGROUND

Satellite positioning systems (SPSs), such as the global positioning system (GPS), have enabled navigation services for mobile handsets in outdoor environments. Likewise, particular techniques for obtaining estimates of positions of mobile devices in indoor environments may enable enhanced location based services in particular indoor venues such as residential, governmental or commercial venues. For example, a range between a mobile device and a transceiver positioned at a fixed location may be measured based, at least in part, on a measurement of a received signal strength (RSSI) or a round trip time (RTT) measured between transmission of a first message from a first device to a second device and receipt of a second message at the first device transmitted in response to the first message.

Use of RTT and RSSI measurements for ranging is very inaccurate in band limited systems such as Bluetooth. With RTT based ranging in particular, this is in part because narrow bandwidth may involve a blurring of multipath components. In wireless telecommunications, multipath is the propagation phenomenon that results in radio signals reaching the receiving antenna by two or more paths. Inaccuracy occurs also because accuracy typically depends on determination of precise times of reception and departure in the presence of drifting clocks and complex receive chains. Therefore, measuring ranges between devices using RTT based measurements is complex and may suffer inaccuracies in the presence of clock drift and multipath.

Accordingly, there is a need for systems, apparatus, and methods that improve conventional approaches including the methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a method includes: transmitting a first carrier signal from an antenna of a first device; receiving the first carrier signal by a first antenna element of a second device; receiving the first carrier signal by a second antenna element of the second device; transmitting a second carrier signal from the first antenna element of the second device; and receiving the second carrier signal by the antenna of the first device.

In another aspect, a non-transitory computer-readable medium includes: transmitting a first carrier signal from an antenna of a first device; receiving the first carrier signal by a first antenna element of a second device; receiving the first carrier signal by a second antenna element of the second device; transmitting a second carrier signal from the first antenna element of the second device; and receiving the second carrier signal by the antenna of the first device.

In still another aspect, an apparatus includes: a memory; an antenna; a processor coupled to the memory and the antenna, the processor configured to: transmit a first carrier signal from an antenna of a first device; receive the first carrier signal by a first antenna element of a second device; receive the first carrier signal by a second antenna element of the second device; transmit a second carrier signal from the first antenna element of the second device; and receive the second carrier signal by the antenna of the first device.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
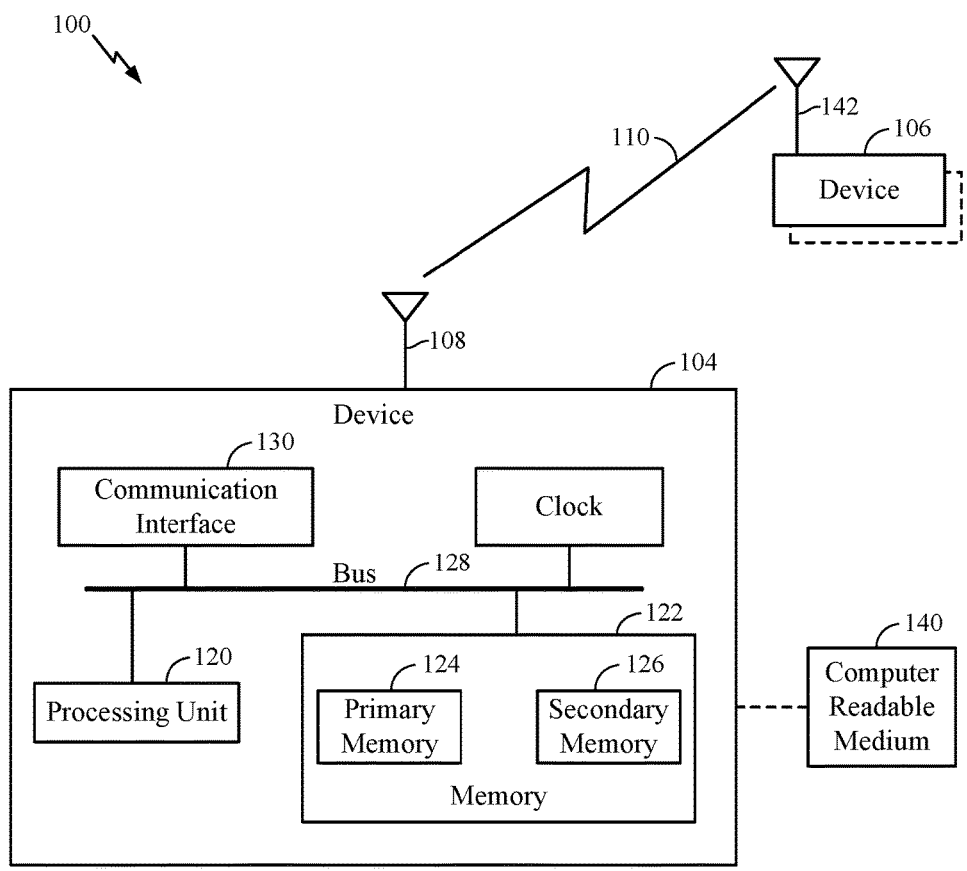
FIG. 1 illustrates a schematic block diagram of an example wireless device in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein provide improvements to conventional methods, apparatus, and systems, as well as other previously unidentified needs. For example, antenna switching technology may be used to provide spatial diversity by making Round Trip Phase (RTP) measurements to each antenna element of an antenna array or a group of antennas with known relative positions. Phase measurements are very sensitive to multipath. Hence, in difficult multipath environments the range estimate from RTP can be compromised. Alternatively, instead of switching an antenna array, multiple antennas may be used and the measurements may be made simultaneously. Alternatively, one RTP measurement is made to one antenna element and relative (receive-only) phase measurements are made to the other antenna elements. RTP is a method for estimating the distance between two devices (e.g., two Bluetooth/Bluetooth Low Energy radios, such as described in the well-known Bluetooth specification version 5.1) by making relative carrier phase measurements at multiple frequencies. A range between a first and second device may be estimated based, at least in part, on multiple RTP measurements based, at least in part, on wireless carrier signals transmitted between the first device and a second device. Additionally, use of multiple RTP measurements obtained with different carrier signals transmitted at different carrier frequencies may enable resolving ambiguities in range estimates based on RTP measurements using only carrier signals transmitted at substantially the same carrier frequency. In this context, carrier frequencies that are "substantially the same" means carrier frequencies of different signals (such as carrier signals) that deviate within a small error, or such that an error in an RTP measurement based on the different signals is easily corrected. It may also be observed that phase measurements based on a carrier signal may intrinsically enable higher spatial resolution over a round trip time (RTT) measurement techniques based on a baseband signal. RTT measures the time between transmission of a first message from a first device to a second device and receipt of a second message at the first device transmitted in response to the first message. Use of multiple RTP measurements based on carrier signals transmitted at different frequencies may enable techniques to measure ranges between devices with reduced sensitivity to precise timing errors and with much higher spatial accuracy than is possible using conventional RTT with band limited signals. In particular implementations, use of multiple RTP measurements may enable sub meter accuracy range measurements, and may achieve resolution of range on the order of a few centimeters in a multipath-free environment. This may enable substantial improvement in range estimations over an equivalent one based on RTT measurements.

In practice, one radio transmits a carrier from its local oscillator (LO), while a second radio receives it, by mixing with its LO set to a frequency close to the transmitted carrier frequency. The second radio captures IQ samples from which a first carrier phase estimate is made. Then, without either radio changing their LO frequencies, and within a short period of time, their roles are reversed. Hence, the second radio transmits a carrier from its LO, while the first, mixes down using its LO, and a second carrier phase estimate is made. In this description a phase estimate represents the phase of a complex or IQ number, which may be explicitly evaluated and expressed in radians or degrees or could be implicitly represented by the phase of the complex or IQ number itself. The two phase estimates can be combined to form a residual range. In this description a residual range is a component part of a final range estimate and can be described in terms of a distance in meters d, a phase value ϕ in degrees or radians or the implicit phase of a complex number. In this context d relates to ϕ via a constant scale factor, for example $$d = \frac{\phi \lambda}{4\pi}.$$

where λ is the carrier wavelength. Further phase estimates at different carrier frequencies allow multiple residual range estimates to be combined into a final range estimate.

The use of the angle-of-arrival (AoA) switching technology also provides a means to combine range with an angle to provide a 2D (or 3D) position. The next generation of Bluetooth radios in accordance with Bluetooth specification v5.1 contain a technology called AoA. AoA uses a switch to select one of a number of antenna inputs into a single radio receive-chain. This will allow multiple phase measurements to be made that will improve the range estimate based on those multiple phase measurements. For example, if the AoA switching technology is used with a 2D antenna array (e.g., 4 antenna elements arranged in a 2×2 grid), then both an azimuth and elevation angle can be determined. These two angles can be used to further improve the final range estimate. In addition, these two angles can be combined with the final range estimate to provide a 3D position.

Thus, the apparatus and methods disclosed herein may reduce the error of RTP measurements in the presence of multipath by combining the phase results between a single antenna on one wireless device and multiple antennas on a second wireless device. Another aspect may use an angle of arrival (AoA) measurement to rotate some measured signals so that they can be coherently combined, before determining a range. Yet another aspect may use the AoA angle measurement, when combined with the RTP range, to provide a relative two dimensional (2D) or three dimensional (3D) position. Examples herein include: (1) using RTP, calculate ranges between the single antenna and each element of the antenna array and average the individual ranges to get a final range (2) capture the raw IQ data from both radios received between the single antenna and each element of the antenna array, and calculate an angle of arrival from the IQ samples received by the antenna array, and use that angle to correct the phases of the IQ samples so they can be coherently combined to form a single phase estimate for each radio, which are combined to form a residual range, which when combined with other residual ranges made at different frequencies can be formed into an final range (3) capture IQ samples received from each element of the antenna array sent from the single antenna and capture IQ samples from the single antenna, sent from only the first element of the array, then calculate an angle of arrival and reconstruct the missing IQ samples of the other elements of the array, that were not sent, using the angle of arrival and the single antenna's IQ samples, and coherently combine all the IQ samples to form a residual range, and after similar measurements at different frequencies form a final range from the residual ranges.

FIG. 1 illustrates a schematic block diagram of an example wireless device in accordance with some examples of the disclosure. System 100 may include, for example, a first device 104 (e.g., a first Bluetooth enabled wireless device) and a second device 106 (e.g., a second Bluetooth enabled wireless device), which may be operatively coupled together through a wireless communications network. In a particular implementation, as discussed below, first device 104 and second device 106 may exchange carrier signals to measure RTP for use in computing a measured range between first device 104 and second device 106. In an aspect, first device 104 or second device 106 may comprise any one of several different devices such as, for example, a mobile device or access point. Also, first and second devices 104 and 106 may be included in a wireless communications network that may comprise one or more wireless access points, for example. However, claimed subject matter is not limited in scope in these respects. The first device 104 and the second device 106 may be Bluetooth enabled wireless devices configured to operate in accordance with Bluetooth specification 5.1 including Bluetooth Low Energy configurations.

First and second devices 104 and 106 may be representative of any device, appliance or machine that is configurable to exchange data over a wireless communications network. By way of example but not limitation, any of first device 104 or second device 106 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof.

Similarly, a wireless communications network, as shown in FIG. 1, is representative of one or more communication links, processes, or resources configurable to support the exchange of data and measurements between at least first device 104 and second device 106. By way of example but not limitation, a wireless communications network may include wireless or wired communication links, telephone or telecommunications systems, data buses or channels, optical fibers, terrestrial or space vehicle resources, local area networks, personal area networks, wide area networks, intranets, the Internet, routers or switches, and the like, or any combination thereof. As illustrated, for example, by the dashed lined box illustrated as being partially obscured of second device 106, there may be additional like devices operatively coupled to system 100.

It is recognized that all or part of the various devices and networks shown in FIG. 1, and the processes and methods as further described herein, may be implemented using or otherwise including hardware, firmware, software, or any combination thereof. Thus, by way of example but not limitation, first device 104 may include at least one processing unit 120 that is operatively coupled to a memory 122 through a bus 128.

Processing unit 120 is representative of one or more circuits configurable to perform at least a portion of a data computing procedure or process. By way of example but not limitation, processing unit 120 may include one or more processors, controllers, microprocessors, microcontrollers, application specific integrated circuits, digital signal processors, programmable logic devices, field programmable gate arrays, and the like, or any combination thereof.

Memory 122 is representative of any data storage mechanism. Memory 122 may include, for example, a primary memory 124 or a secondary memory 126. Primary memory 124 may include, for example, a random access memory, read only memory, similar types of non-transitory computer readable storage mediums, etc. While illustrated in this example as being separate from processing unit 120, it should be understood that all or part of primary memory 124 may be provided within or otherwise co-located/coupled with processing unit 120. In a particular implementation, memory 122 and processing unit 120 may be configured to execute one or more aspects of process discussed herein in connection with FIG. 8.

Secondary memory 126 may include, for example, the same or similar type of memory as primary memory or one or more data storage devices or systems, such as, for example, a disk drive, an optical disc drive, a tape drive, a solid state memory drive, etc. In certain implementations, secondary memory 126 may be operatively receptive of, or otherwise configurable to couple to, a computer-readable medium 140. Computer-readable medium 140 may include, for example, any non-transitory medium that can carry or make accessible data, code or instructions for one or more of the devices in system 100. Computer-readable medium 140 may also be referred to as a storage medium.

First device 104 may include, for example, a communication interface 130 that provides for or otherwise supports the operative coupling of first device 104 to a wireless communications network at least through an antenna 108. Antenna 108 may be a single antenna or multiple antennas such as an antenna array. Hereinafter, antenna 108 will be described as a single antenna but it should be understood that multiple antennas or antenna arrays with multiple elements may be used instead. The second device 106 may also include a communication interface that provides for or otherwise supports the operative coupling of second device 106 to a wireless communications network at least through an antenna 142. Antenna 142 may be multiple antennas or an antenna array with multiple elements. By way of example but not limitation, communication interface 130 may include a network interface device or card, a modem, a router, a switch, a transceiver, and the like. In other alternative implementations, communication interface 130 may comprise a wired/LAN interface, wireless LAN interface (e.g., IEEE std. 802.11 wireless interface), Bluetooth® interface and/or a wide area network (WAN) air interface. It should be understood, however, that these are merely examples of air interfaces that may be employed for techniques described herein, and claimed subject matter is not limited in this respect. In a particular implementation, antenna 108 in combination with communication interface 130 may be used to implement transmission and reception of signals. In one implementation, communication interface 130 may comprise radio transceiver circuitry configurable to detect a phase of a wireless carrier signal transmitted from second device 106 and received at antenna 108. Such radio transceiver circuitry may also be configurable to transmit wireless carrier signals at multiple different carrier frequencies.

First device 104 may include, for example, an input/output device. Input/output device is representative of one or more devices or features that may be configurable to accept or otherwise introduce human or machine inputs, or one or more devices or features that may be configurable to deliver or otherwise provide for human or machine outputs. By way of example but not limitation, input/output device may include an operatively configured display, speaker, keyboard, mouse, trackball, touch screen, data port, etc.

In some examples herein, aspects of the latest Bluetooth® (BT) protocol for determination of angle of arrival (AoA) may be used for measuring a range between devices based, at least in part, on measurements of round-trip signal phase obtained from wireless carrier signals transmitted between first and second devices 104 and 106. See, for example, U.S. Pat. App. No. 20180077589 expressly incorporated herein in its entirety. Some particular aspects of the BT AoA process are as follows:

1. BT AoA packets may include one or more carriers;
2. BT AoA process contains good frequency diversity due to the inbuilt frequency hopping; and
3. BT AoA process is designed to determine angle (separation may allow relative localization of two devices).

In one aspect, a round-trip phase (RTP) between first and second devices 104 and 106 may be computed based on two phase measurements: a first phase measurement obtained at first device 104 from acquisition of a wireless carrier signal transmitted by second device 106, and a second phase measurement obtained at second device 106 from acquisition of a wireless carrier signal transmitted by first device 104. This may allow cancellation of unknown phase offsets in receivers and transmitters of the respective first and second devices 104 and 106. In this context, "acquisition" of a signal as referred to herein means obtaining information from the signal received at a receiver device. For example, acquisition of a received signal may comprise determination of a signal phase of the received signal. Thus, multiple measurements of RTP obtained from signals transmitted at different carrier frequencies may be used to compute a measured range between the first and second devices. In one implementation, this method to compute a range between devices based on RTP measurements may be implemented with modification to the BT AoA process as discussed below. However, this is merely an example of a type of communication format that may be used in transmitting and acquiring wireless carrier signals for obtaining RTP measurements, and other communication formats may be used without deviating from claimed subject matter.

RTP works best when there is strong line of sight signal between the two radios. It has been found that performance degrades when there are also multipath signals. For example, in a room there are reflections from walls, ceiling, floor and other obstacles that all contribute towards multipath. This multipath effect degrades signals and introduces delays causing phase shifts. Instead of using a single antenna on both radios, one approach to reduce the error in the phase measurement is to use spatial diversity. In this approach one or both radios use multiple antennas to make additional phase measurements, which are then combined.

A second approach further improves the quality of the range estimate by using an angle-of-arrival estimate to coherently combine raw measurements from multiple antennas before a range estimate is made. In a modification to the second approach, similar results are obtained using far fewer raw measurements, which simplifies the calculations and reduces power.

The RTP calculations use carrier phase measurements as a means to determine range. One way to improve performance is to coherently sum the raw complex sample data from multiple antennas, spaced about half a wavelength apart. One, problem is how to coherently add the raw complex samples together, when they have travelled different distances and hence have different phases. In order to do this the samples must first be rotated (or de-rotated) to remove the offset due to distance difference caused by antenna separation. Angle-of-arrival (or departure) first determines the relative angle between the transmitter and receiver antenna array. This can be achieved using well known beam forming techniques. Once the angle is known, a phase correction can be made to the samples from each antenna, so they can then be added. This assumes that either or both the transmitter and receiver are using an antenna array. The relative angle is determined with respect to the axis of the antenna array or a point of reference. The array elements could be in a plane in which case a single "azimuth" angle is determined, or they could be arranged in a more general 3D space, in which case both "azimuth" and "elevation" can be determined. In this latter case the overall system performance would ultimately be improved and a 3D position could be determined.

Figure 2:
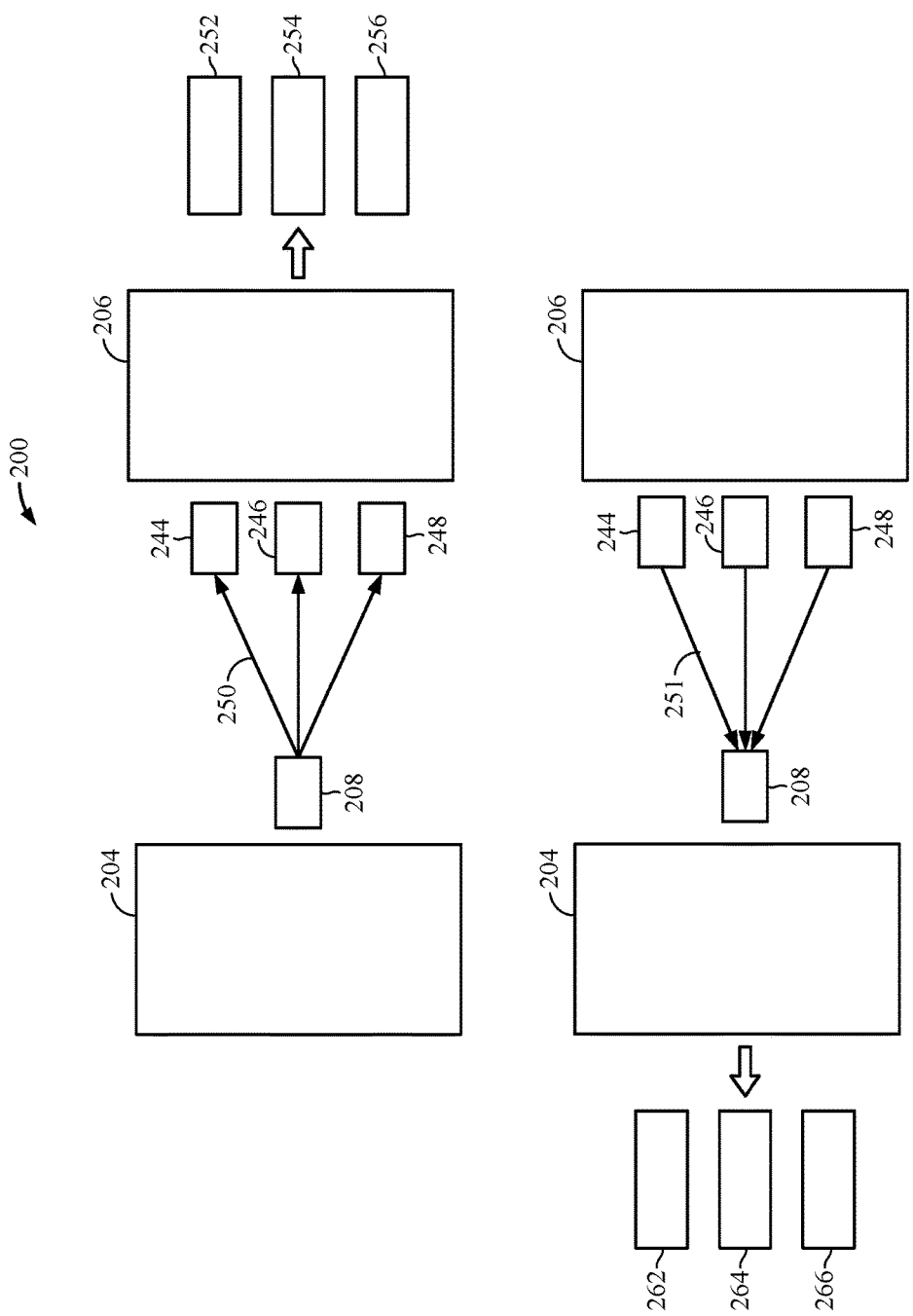
FIG. 2 illustrates two exemplary devices transmitting from one antenna to multiple antennas and vice versa in accordance with some examples of the disclosure.

FIG. 2 illustrates two exemplary devices transmitting from one antenna to multiple antennas and vice versa in accordance with some examples of the disclosure. As shown in FIG. 2, a system 200 (e.g., system 100) may include a first device 204 with an antenna 208, a second device 206 with a first antenna element 244, a second antenna element 246, and a third antenna element 248. While three antenna elements are shown in FIG. 2, it should be understood that two or more than three antenna elements may be used. The system 200 may use an averaging method and an optional corrected phase method to improve the measurement accuracy. For example, the first device 204 may transmit a first carrier signal 250 that is sampled by the first antenna element 244 to produce a first sample 252 ($y_1$), the second antenna element 246 to produce a second sample 254 ($y_2$), and the third antenna element 248 to produce a third sample 256 ($y_3$). The first antenna element 244, a second antenna element 246, and a third antenna element 248 may be switched in a known sequence (or could capture all yn concurrently) during reception of the first carrier signal 250. If sequentially measured, the delta t will be known to a given accuracy. The second device 206 captures samples from each antenna-element: $y_n$. (n=1 to 3 in this example). Then, a reverse phase measurement is made, where the second device 206 transmits a second carrier signal 251 from the first antenna element 244 that is sampled by the antenna 208 to produce a fourth sample 262 ($x_1$), from the second antenna element 246 to produce a fifth sample 264 ($x_2$), and from the third antenna element 248 to produce a sixth sample 266 ($x_3$). The six samples described are phase estimates that may be used to determine residual range estimates for each antenna pairing. Furthermore, the first antenna element 244, a second antenna element 246, and a third antenna element 248 may be switched in a known sequence during transmission of the second carrier signal 251. The first device 204 captures samples transmitted from each antenna-element: $x_n$. (n=1 to 3 in this example). Additionally, it should be understood that the second device 206 should not alter its clock that introduces a phase offset between reception and transmission. The initial phases for each transmission path may be aligned or at a known phase offset.

This process may be repeated over multiple frequencies for the first carrier signal 250 and the second carrier signal 251 (in the industrial, scientific, and medical radio (ISM) band for example) from which multiple residual ranges are determined for each antenna pairing at each different frequency. In addition, the first carrier signal 250 and the second carrier signal 251 may be different frequencies. Also, while carrier signals 250 and 251 are shown, each carrier signal 250 and 251 may be three different signals at the same or different frequencies. For each RTP "residual range" measurement, two phase measurements are required: one in each direction. During this period, neither the first device 204 or the second device 206 may change its internal carrier or mixing frequency. Each pair of antennas 208<->244, 208<->246 and 208<->248 yields three "residual ranges" that could be averaged in one approach. Ideally, each carrier signal 250 and 251 is the same frequency. Practical radio constraints imply that each carrier signal 250 and 251 are within 50 kHz. The multiple antennas sample the same carrier but at slightly different times using the switch.

As used herein, the term "residual range" distinct from "final range". In order to achieve the final range, multiple residual ranges are estimated over multiple carrier frequencies (2.4 GHz to 2.48 GHz for Bluetooth), for example. Each residual range estimate is modulo the wavelength. (e.g., a single residual range measures the distances modulo ~12 cm.) Thus, a single residual range estimate is based on a single carrier frequency and the final range estimate is based on multiple residual range estimates—over multiple frequencies. A residual range estimate only measures modulo the wavelength (e.g., at 2.4 GHz measures from 0 to ~12 cm.). Multiple measurements are required to resolve the ambiguity to get ranges beyond 12 cm.

Figure 3:
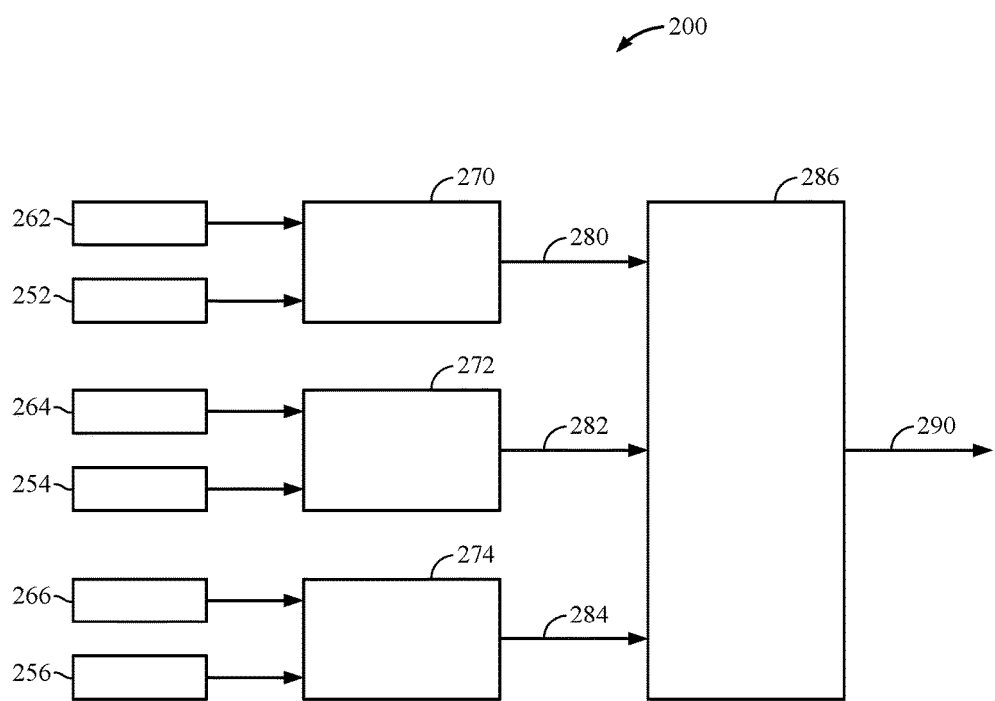
FIG. 3 illustrates an exemplary averaging of range measurements in accordance with some examples of the disclosure.

FIG. 3 illustrates an exemplary averaging of residual range measurements in accordance with some examples of the disclosure. It should be understood that there may be other approaches such as de-rotating, creating a plurality of coherent samples, and having all three resulting measurements combined, for example. As shown in FIG. 3, the system 200 may average the range estimates determined by using a RTP calculation on each of the six samples (first sample 252 through the sixth sample 266). As shown in FIG. 3, the first sample 252 and the fourth sample 262 may be used in the RTP calculation 270 (e.g., see RTP calculation described above) to produce a first residual range estimate 280; the second sample 254 and the fifth sample 264 may be used in the RTP calculation 272 to produce a second residual range estimate 282; and the third sample 256 and the sixth sample 266 may be used in the RTP calculation 274 to produce a third residual range estimate 284. Next, the first residual range estimate 280, the second residual range estimate 282, the third residual range estimate 284 may be used in an average calculation 286 to produce a final range 290 of the first device 204 to the second device 206. While three pairs of samples are shown to produce three residual range estimates, it should be understood that two or more than three pairs may be used (based on two or more than three antenna elements or samples based on different carrier frequencies). Thus, this approach may be improved by using more than 3 antenna elements and by applying outlier excision to the range estimates, if some prior information about possible ranges is known.

Figure 4:
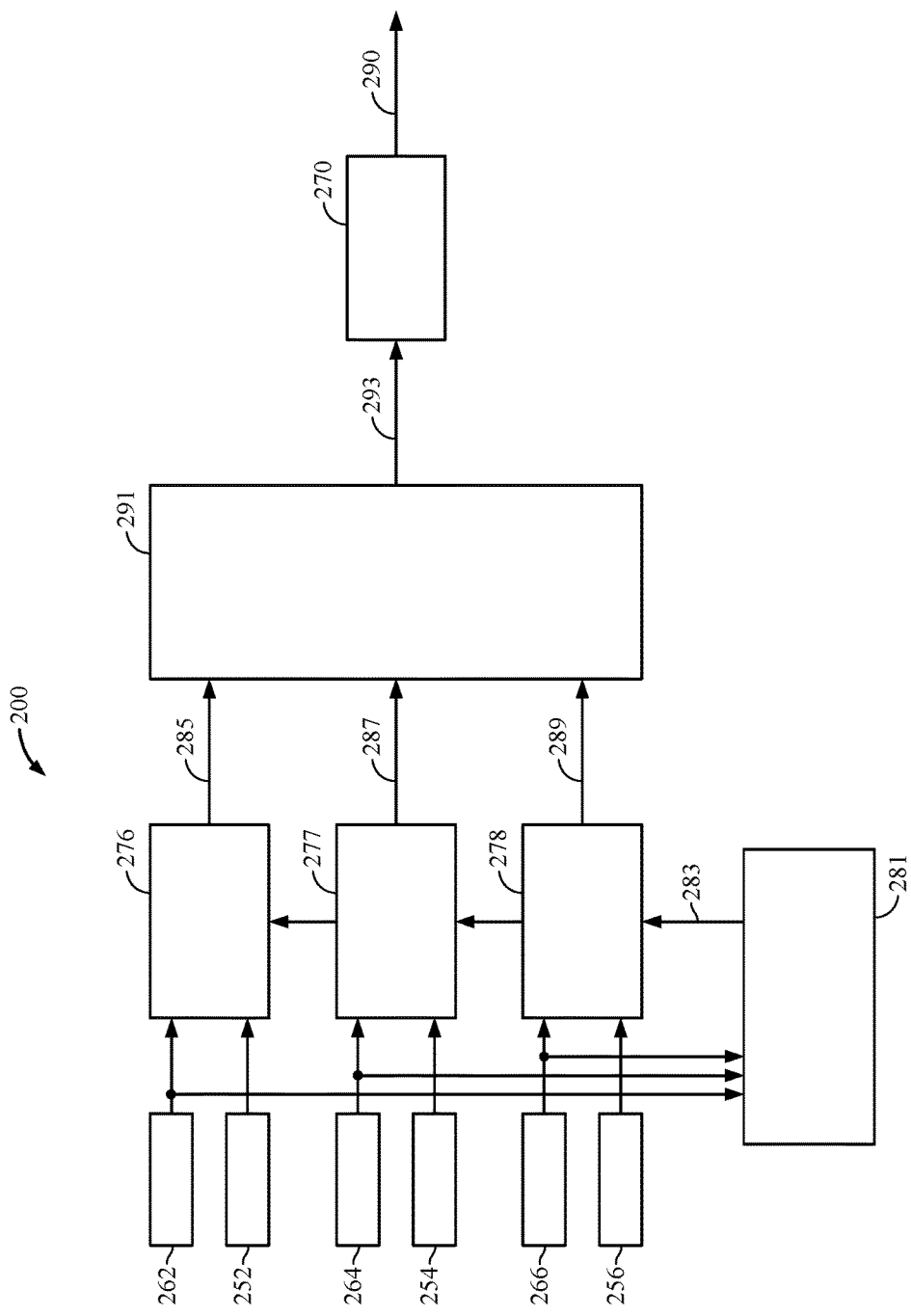
FIG. 4 illustrates an exemplary phase correction for average range measurements in accordance with some examples of the disclosure.

FIG. 4 illustrates an exemplary phase correction for average range measurements in accordance with some examples of the disclosure. As shown in FIG. 4, the system 200 may use an optional phase correction calculation based on AoA to improve the accuracy of the range estimates. As shown in FIG. 4, the fourth sample 262, the fifth sample 264, and the sixth sample 266 may be used in an AoA calculation 281 (e.g., beam forming described below) to determine an AoA 283 (θ). The system 200 may then use the AoA 283, the first sample 252, and the fourth sample 262 in a first phase correction calculation 276 to produce a first corrected sample 285; the AoA 283, the second sample 254, and the fifth sample 264 in a second phase correction calculation 277 to produce a second corrected sample 287; the AoA 283, the third sample 256, and the sixth sample 266 in a third phase correction calculation 278 to produce a third corrected sample 289. The first corrected sample 285, the second corrected sample 287, and the third corrected sample 289 may be summed 291 to produce a combined sample 293.

The combined sample 293 may be used in a RTP distance calculation 270 to produce a range 290. While three pairs of samples are shown to produce three range estimates, it should be understood that two or more than three pairs may be used (based on two or more than three antenna elements or samples based on different carrier frequencies). Thus, this approach may be improved by using more than 3 antenna elements.

The AoA calculation 281 may include the following processes:

(1) Define a set of M antenna elements (e.g., first antenna element 244, second antenna element 246, third antenna element 248, and antenna 208) with locations defined as complex numbers: $P=\{p_1, p_2, p_3, \ldots p_M\}$.

(2) Define a set of captured samples (e.g., fourth sample 262, fifth sample 264, sixth sample 266 from each antenna 208 on the first device 204 for a carrier signal wavelength of λ: $A=\{x_1, x_2, x_3 \ldots x_M\}^\lambda$ And also samples (e.g., first sample 252, second sample 254, third sample 256) from the second device 206: $B=\{y_2, y_3 \ldots y_M\}^\lambda$ (3) Determine AoA 283 (or departure) using beamforming $$\theta = \underset{\theta_i}{\operatorname{argmax}} \sum_{n=1}^{M} \left| y_i e^{\frac{-j2\pi\lambda}{Re(P_n e^{-j\theta_i})}} \right|^2$$

(4) Determine phase corrections factor for each λ so that the signals from each antenna element are nominally in phase according to the measured angle θ

$$r_n^\lambda = e^{\frac{-j2\pi Re(P_n e^{-j\theta})}{\lambda}} \Big|_{n=1\ldots m}$$

(5) Apply phase corrections (e.g., first phase correction calculation 276, second phase correction calculation 277, third phase correction calculation 278) to both sample sets, for a given λ, and sum (e.g., summed 291)

$$x_s^\lambda = \sum_{n=1}^{M} r_n^\lambda x_n^\lambda$$

$$y_s^\lambda = \sum_{n=1}^{M} r_n^\lambda y_n^\lambda$$

to produce a corrected sample (e.g., combined sample 293) Since the corrected samples are nominally in phase they add more coherently.

The summed calculation 291 can be performed using one of the following methods:

(1) The phases of $x_s^\lambda$ and $y_s^\lambda$ are added to form a residual range. The residual range can be expressed in degrees or radians but can also be expressed in meters if the phase is scaled by $$\frac{\lambda}{2\pi}.$$

(2) The complex values $x_s^\lambda$ and $y_s^\lambda$ are multiplied together, which effectively adds their phases, but also preserves some magnitude information. In this case the residual range is a complex number, encapsulating the added phases.

An example RTP distance calculation 270 comprises the following processes:

(1) A set of samples $x_s^\lambda$ and $y_s^\lambda$ are collected over multiple uniformly spaced frequencies ($\lambda$) and ordered by frequency.
(2) For each $\lambda$ a residual range is calculated and expressed as the phase of a complex number.
(3) An FFT is applied to the set of complex residual ranges. The location of the peak of the FFT determines the final range estimate.

Figure 5:
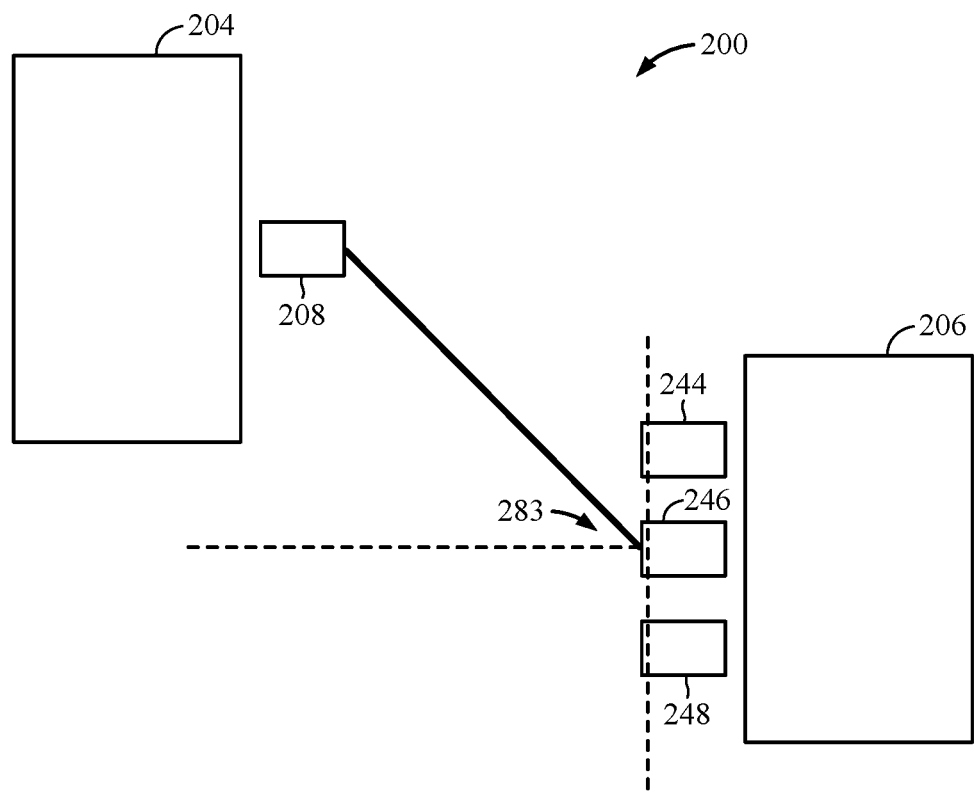
FIG. 5 illustrates an exemplary azimuth angle determination between two devices in accordance with some examples of the disclosure.

FIG. 5 illustrates an exemplary azimuth angle determination between two devices in accordance with some examples of the disclosure. As shown in FIG. 5, an AoA 283 θ may be defined as the azimuth angle between the array normal of the antenna array (composed of the first antenna element 244, the second antenna element 246, and the third antenna element 248) and the single antenna 208. If the antenna elements 244-248 were out of the page-plane, an elevation angle ϕ could also be defined. The angle θ (and ϕ) must be estimated before samples can be combined. It should be noted that the path length (and hence the phases) are different from the single antenna 208 to each element in the antenna array composed of the first antenna element 244, the second antenna element 246, and the third antenna element 248).

Figure 6:
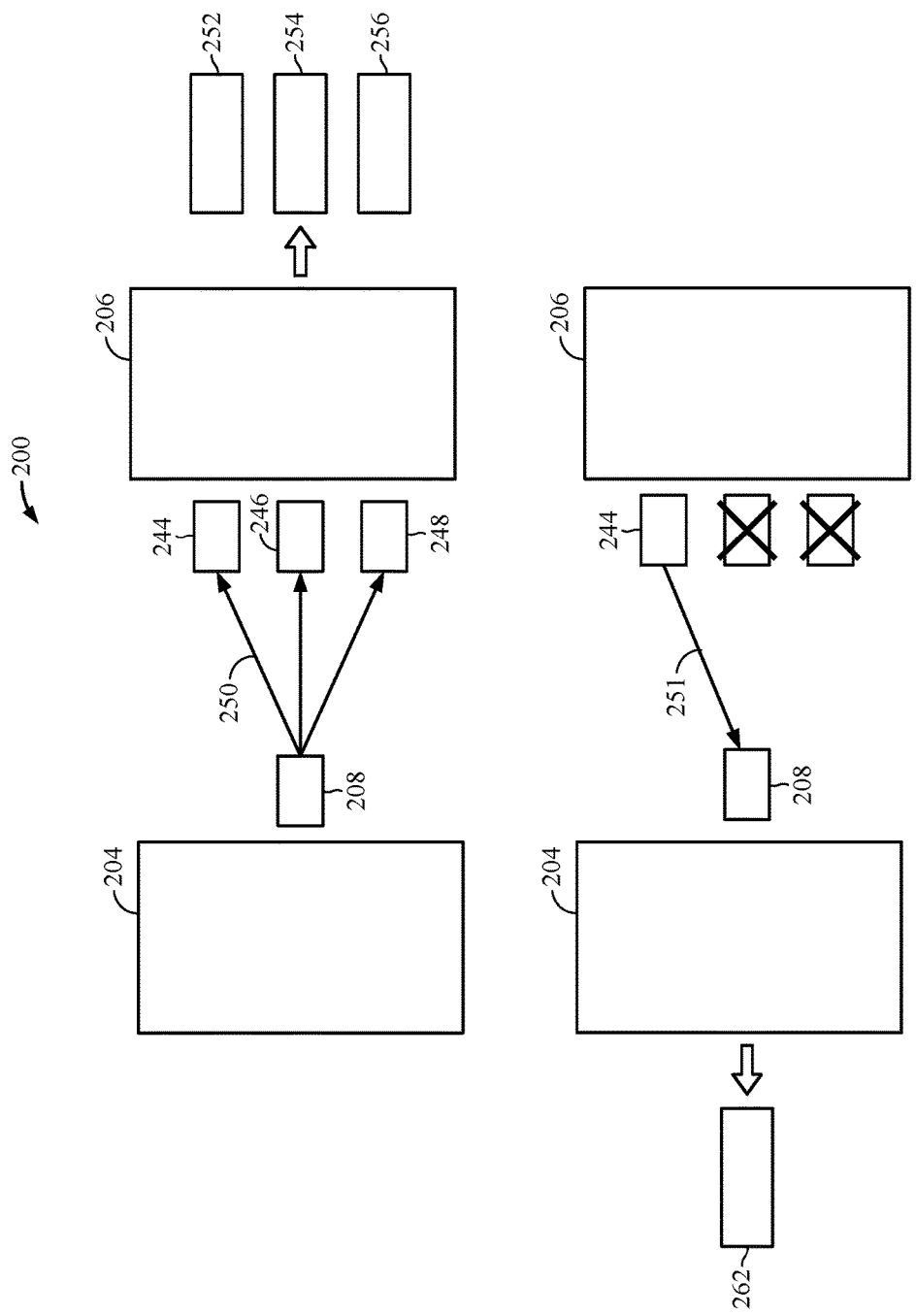
FIG. 6 illustrates two exemplary devices transmitting from one antenna to multiple antennas in accordance with some examples of the disclosure.

FIG. 6 illustrates two exemplary devices transmitting from one antenna to multiple antennas in accordance with some examples of the disclosure. FIG. 6 shows a system 200 using a reduced power approach. In this approach, the return signal measurement only requires a single measurement: the second device 206 does not require switching during transmit resulting in less hardware, less buffering is required in the first device 204, and less overall energy required to perform a measurement. The missing measurements illustrated in FIG. 2 may be approximated from the measurements made.

As shown in FIG. 6, a system 200 (e.g., system 100) may include a first device 204 with an antenna 208, a second device 206 with a first antenna element 244, a second antenna element 246, and a third antenna element 248. While three antenna elements are shown in FIG. 6, it should be understood that two or more than three antenna elements may be used. For example, the first device 204 may transmit a first carrier signal 250 that is sampled by the first antenna element 244 to produce a first sample 252 (y1), the second antenna element 246 to produce a second sample 254 (y2), and the third antenna element 248 to produce a third sample 256 (y3). The first antenna element 244, a second antenna element 246, and a third antenna element 248 may be switched in a known sequence during reception of the first carrier signal 250. The second device 206 captures samples from each antenna-element: y_n. (n=1 to 3 in this example). Then, a reverse measurement is made, where the second device 206 transmits a second carrier signal 251 from the first antenna element 244 that is sampled by the antenna 208 to produce a fourth sample 262 (x1). The first antenna element 244 may be chosen close to the centroid of the antenna array.

This process may be repeated over multiple frequencies for the first carrier signal 250 and the second carrier signal 251 (in the industrial, scientific, and medical radio (ISM) band for example), from which a range is determined. In addition, the first carrier signal 250 and the second carrier signal 251 may be different frequencies. Also, while carrier signals 250 and 251, each carrier signal 250 and 251 may be three different signals at the same or different frequencies.

Figure 7:
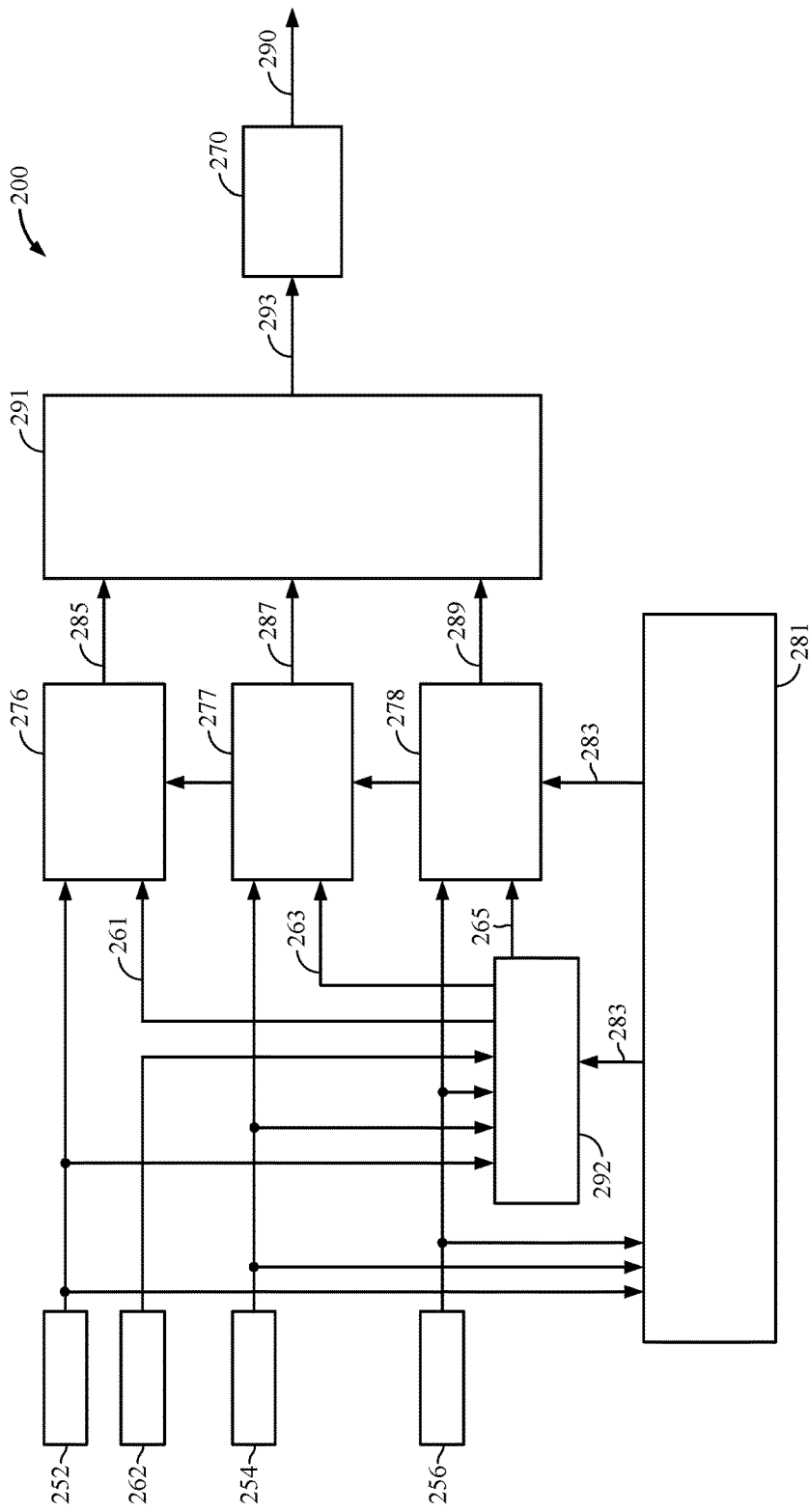
FIG. 7 illustrates an exemplary phase correction for reduced measurements between two devices in accordance with some examples of the disclosure.

FIG. 7 illustrates an exemplary phase correction for reduced measurements between two devices in accordance with some examples of the disclosure. As shown in FIG. 7, an alternative reduced measurement process may be used in system 200. In this approach, the first device 204 makes only a single measurement from the first antenna element 244 in the second device 206 (See FIG. 6 and accompanying text). The other measurements in the first device 204 are reconstructed: The radio frequency channel between two antennas is symmetrical—(Rx=Tx). Hence, missing samples from the first device 204 are the same as samples from the second device 206, except for a complex scale factor. The absolute phase of one antenna $x_1$ is known (the single measurement). The phases of other antennas are determined relatively based on antenna geometry.

As shown in FIG. 7, the first sample 252, the second sample 254, and the third sample 256 may be used in an AoA calculation 281 (e.g., beam forming described above with reference to FIG. 4) to determine an AoA 283 (θ). The system 200 may then perform a reconstruction calculation 292 to produce a first reconstructed sample 261 (the first reconstructed sample may also be the fourth sample 262), a second reconstructed sample 263, and a third reconstructed sample 265 using the AoA 283 and the first sample 252, the second sample 254, and the third sample 256. The reconstruction calculation 282 may include reconstruction missing samples:

$$x_n^\lambda = x_1^\lambda \cdot \frac{y_n^\lambda}{y_1^\lambda} \bigg|_{n=2...m}$$

The system 200 may then use the AoA 283, the first sample 252, and the first reconstructed sample 261 in a first phase correction calculation 276 to produce a first corrected sample 285; the AoA 283, the second sample 254, and the second reconstructed sample 263 in a second phase correction calculation 277 to produce a second corrected sample 287; the AoA 283, the third sample 256, and the third reconstructed sample 265 in a third phase correction calculation 278 to produce a third corrected sample 289. The first corrected sample 285, the second corrected sample 287, and the third corrected sample 289 may be summed 291 to produce a combined sample 293. The combined sample 293 may be used in a RTP calculation 270 to produce a residual range 290. While three pairs of samples are shown to produce three range estimates, it should be understood that two or more than three pairs may be used (based on two or more than three antenna elements or samples based on different carrier frequencies). Thus, this approach may be improved by using more than 3 antenna elements.

Figure 8:
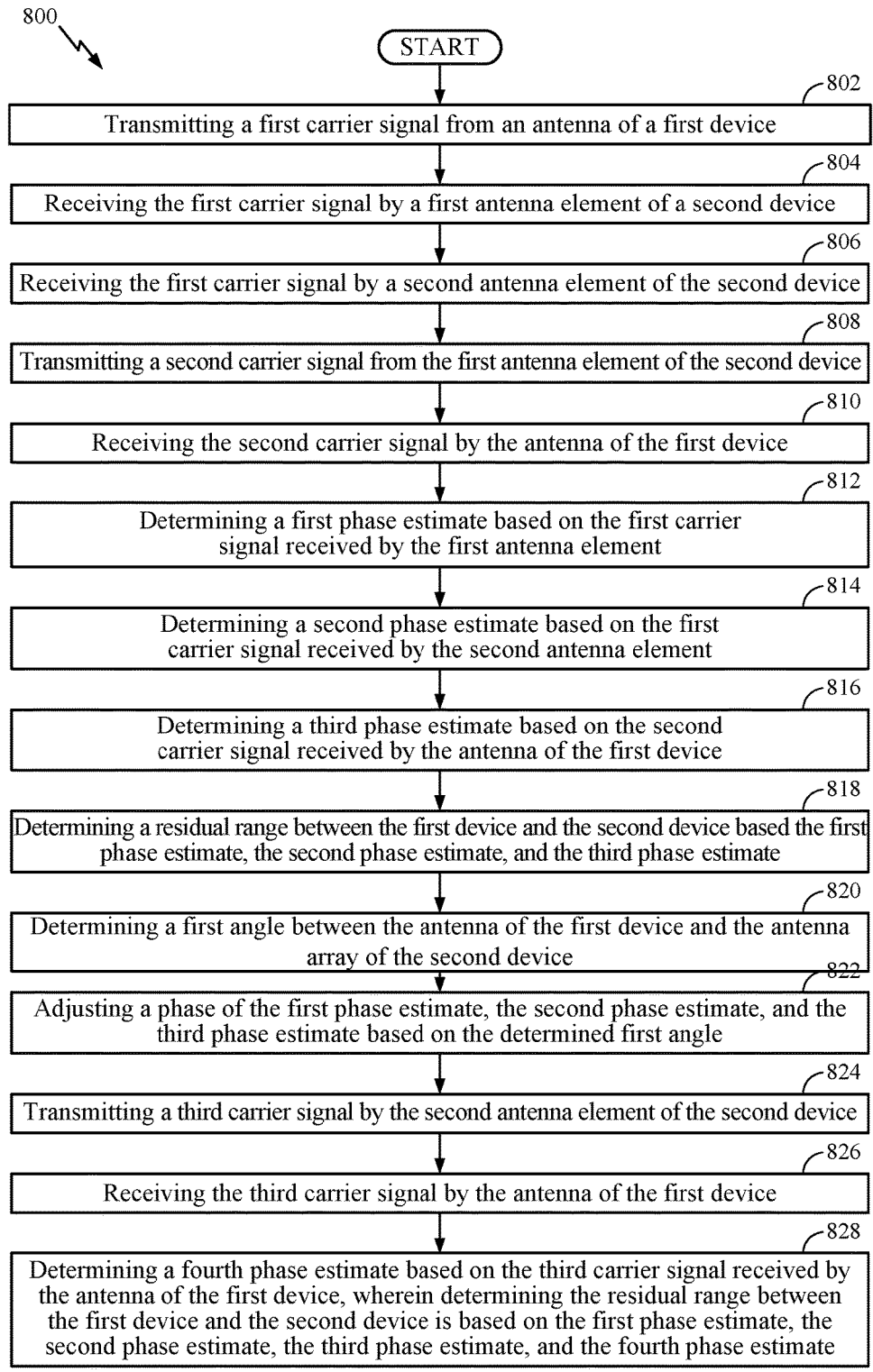
FIG. 8 illustrates an exemplary method in accordance with some examples of the disclosure.

FIG. 8 illustrates an exemplary method in accordance with some examples of the disclosure. As shown in FIG. 8, a partial method 800 for a range measurement between two devices may begin in block 802 with transmitting a first carrier signal from an antenna of a first device. The partial method 800 may continue in block 804 with receiving the first carrier signal by a first antenna element of a second device. The partial method 800 may continue in block 806 with receiving the first carrier signal by a second antenna element of the second device. The partial method 800 may continue in block 808 with transmitting a second carrier signal from the first antenna element of the second device. The partial method 800 may continue in block 810 with receiving the second carrier signal by the antenna of the first device. The partial method 800 may continue in block 812 with determining a first phase estimate based on the first carrier signal received by the first antenna element of the second device. The partial method 800 may continue in block 814 with determining a second phase estimate based on the first carrier signal received by the second antenna element of the second device. The partial method 800 may continue in block 816 with determining a third phase estimate based on the second carrier signal received by the antenna of the first device. The partial method 800 may conclude in block 818 with determining a residual range between the first device and the second device based on the first phase estimate, the second phase estimate, and the third phase estimate. Optionally, the partial method 800 may continue in block 820 with determining a first angle between the antenna and the antenna array of the second device and conclude in block 822 with adjusting a phase of the first phase estimate, the second phase estimate, and the third phase estimate based on the determined first angle. Optionally, the partial method 800 may continue in block 824 with transmitting a third carrier signal by the second antenna element of the second device; followed by block 826 with receiving the third carrier signal by the antenna of the first device; and conclude in block 828 with determining a fourth phase estimate based on the third carrier signal received by the antenna of the first device, wherein determining the residual range between the first device and the second device is based on the first phase estimate, the second phase estimate, the third phase estimate, and the fourth phase estimate.

Figure 9:
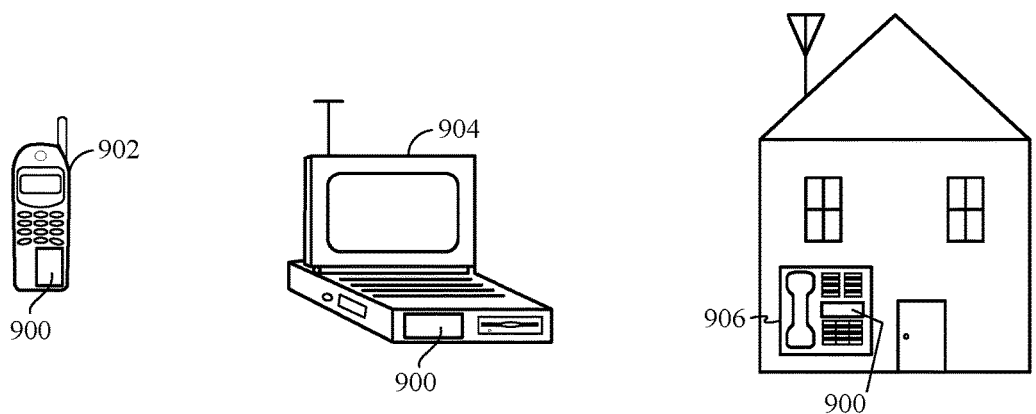
FIG. 9 illustrates various electronic devices that may be integrated with any of the aforementioned wireless devices in accordance with some examples of the disclosure.

FIG. 9 illustrates various electronic devices that may be integrated with any of the aforementioned wireless devices in accordance with some examples of the disclosure. For example, a mobile phone device 902, a laptop computer device 904, and a fixed location terminal device 906 may include an integrated device 900 as described herein. The integrated device 900 may be, for example, any of the integrated circuits, dies, integrated devices, integrated device packages, integrated circuit devices, device packages, integrated circuit (IC) packages, package-on-package devices described herein. The devices 902, 904, 906 illustrated in FIG. 9 are merely exemplary. Other electronic devices may also feature the integrated device 900 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), or any other device that stores or retrieves data or computer instructions, or any combination thereof.

It will be appreciated that various aspects disclosed herein can be described as functional equivalents to the structures, materials and/or devices described and/or recognized by those skilled in the art.

One or more of the components, processes, features, and/or functions illustrated in FIGS. 1-9 may be rearranged and/or combined into a single component, process, feature or function or incorporated in several components, processes, or functions. Additional elements, components, processes, and/or functions may also be added without departing from the disclosure. It should also be noted that FIGS. 1-9 and its corresponding description in the present disclosure is not limited to dies and/or ICs. In some implementations, FIGS. 1-9 and its corresponding description may be used to manufacture, create, provide, and/or produce integrated devices. In some implementations, a device may include a die, an integrated device, a die package, an integrated circuit (IC), a device package, an integrated circuit (IC) package, a wafer, a semiconductor device, a package on package (PoP) device, and/or an interposer.

In this description, certain terminology is used to describe certain features. The term "mobile device" can describe, and is not limited to, a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, an automotive device in an automotive vehicle, and/or other types of portable electronic devices typically carried by a person and/or having communication capabilities (e.g., wireless, cellular, infrared, short-range radio, etc.). Further, the terms "user equipment" (UE), "mobile terminal," "mobile device," and "wireless device," can be interchangeable.

The wireless communication between electronic devices can be based on different technologies, such as code division multiple access (CDMA), W-CDMA, time division multiple access (TDMA), frequency division multiple access (FDMA), Orthogonal Frequency Division Multiplexing (OFDM), Global System for Mobile Communications (GSM), 3GPP Long Term Evolution (LTE), Bluetooth (BT), Bluetooth Low Energy (BLE) or other protocols that may be used in a wireless communications network or a data communications network. Bluetooth Low Energy (also known as Bluetooth LE, BLE, and Bluetooth Smart) is a wireless personal area network technology designed and marketed by the Bluetooth Special Interest Group intended to provide considerably reduced power consumption and cost while maintaining a similar communication range. BLE was merged into the main Bluetooth standard in 2010 with the adoption of the Bluetooth Core Specification Version 4.0 and updated in Bluetooth 5.1 (both expressly incorporated herein in their entirety).

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, actions, operations, elements, and/or components, but do not preclude the presence or addition of one or more other features, integers, actions, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be incorporated entirely within any form of computer readable storage medium having stored therein a corresponding set of computer instructions that upon execution would cause an associated processor to perform the functionality described herein. Thus, the various aspects of the disclosure may be incorporated in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, action, feature, benefit, advantage, or equivalent to the public, regardless of whether the component, action, feature, benefit, advantage, or the equivalent is recited in the claims.

Further, those of skill in the art will appreciate that the various illustrative logical blocks, modules, circuits, and algorithm actions described in connection with the examples disclosed herein may be implemented as electronic hardware, computer software, or combinations of both. To clearly illustrate this interchangeability of hardware and software, various illustrative components, blocks, modules, circuits, and actions have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be incorporated directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art including non-transitory types of memory or storage mediums. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method action or as a feature of a method action. Analogously thereto, aspects described in connection with or as a method action also constitute a description of a corresponding block or detail or feature of a corresponding device. Some or all of the method actions can be performed by a hardware apparatus (or using a hardware apparatus), such as, for example, a microprocessor, a programmable computer or an electronic circuit. In some examples, some or a plurality of the most important method actions can be performed by such an apparatus.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods, systems, and apparatus disclosed in the description or in the claims can be implemented by a device comprising means for performing the respective actions of this method.

Furthermore, in some examples, an individual action can be subdivided into a plurality of sub-actions or contain a plurality of sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method for a range measurement between two devices, comprising:
   transmitting a first carrier signal from an antenna of a first device;
   receiving the first carrier signal by a first antenna element of a second device;
   receiving the first carrier signal by a second antenna element of the second device;
   transmitting a second carrier signal from the first antenna element of the second device;
   receiving the second carrier signal by the antenna of the first device;
   determining a first phase estimate based on the first carrier signal received by the first antenna element;
   determining a second phase estimate based on the first carrier signal received by the second antenna element;
   determining a third phase estimate based on the second carrier signal received by the antenna of the first device; and
   determining a residual range between the first device and the second device based on the first phase estimate, the second phase estimate, and the third phase estimate.

2. The method of claim 1, wherein the first antenna element and the second antenna element are part of an antenna array of the second device.

3. The method of claim 2, further comprising:
   determining a first angle between the antenna of the first device and the antenna array of the second device; and
   adjusting a phase of at least one of the first phase estimate, the second phase estimate, or the third phase estimate based on the determined first angle.

4. The method of claim 3, further comprising determining a position of the second device based on the determined residual range and the determined first angle.

5. The method of claim 1, further comprising:
   transmitting a third carrier signal by the second antenna element of the second device;
   receiving the third carrier signal by the antenna of the first device; and
   determining a fourth phase estimate based on the third carrier signal received by the antenna of the first device, wherein determining the residual range between the first device and the second device is based on the first phase estimate, the second phase estimate, the third phase estimate, and the fourth phase estimate.

6. A non-transitory computer-readable medium comprising instructions that when executed by a processor cause the processor to perform a method comprising:
   transmitting a first carrier signal from an antenna of a first device;
   receiving the first carrier signal by a first antenna element of a second device;
   receiving the first carrier signal by a second antenna element of the second device;
   transmitting a second carrier signal from the first antenna element of the second device;
   receiving the second carrier signal by the antenna of the first device;
   determining a first phase estimate based on the first carrier signal received by the first antenna element;
   determining a second phase estimate based on the first carrier signal received by the second antenna element; and
   determining a third phase estimate based on the second carrier signal received by the antenna of the first device; and
   determining a residual range between the first device and the second device based on the first phase estimate, the second phase estimate, and the third phase estimate.

7. The non-transitory computer-readable medium of claim 6, wherein the first antenna element and the second antenna element are part of an antenna array of the second device.

8. The non-transitory computer-readable medium of claim 7, the method further comprising:
   determining a first angle between the antenna of the first device and the antenna array of the second device; and
   adjusting a phase of the first phase estimate, the second phase estimate, and the third phase estimate based on the determined first angle.

9. The non-transitory computer-readable medium of claim 8, the method further comprising determining a position of the second device based on the determined residual range and the determined first angle.

10. A wireless device for providing a range estimate, comprising:
    a memory;
    an antenna;
    a processor coupled to the memory and the antenna, the processor configured to:
    transmit a first carrier signal from an antenna of a first device;
    receive the first carrier signal by a first antenna element of a second device;
    receive the first carrier signal by a second antenna element of the second device;
    transmit a second carrier signal from the first antenna element of the second device;
    receive the second carrier signal by the antenna of the first device;
    determine a first phase estimate based on the first carrier signal received by the first antenna element;
    determine a second phase estimate based on the first carrier signal received by the second antenna element;
    determine a third phase estimate based on the second carrier signal received by the antenna of the first device; and
    determine a residual range between the first device and the second device based on the first phase estimate, the second phase estimate, and the third phase estimate.

11. The wireless device of claim 10, wherein the first antenna element and the second antenna element are part of an antenna array of the second device.

12. The wireless device of claim 11, the processor further configured to:
    determine a first angle between the antenna of the first device and the antenna array of the second device; and
    adjust a phase of the first phase estimate, the second phase estimate, and the third phase estimate based on the determined first angle.

13. The wireless device of claim 12, wherein the processor is further configured to determine a position of the second device based on the determined residual range and the determined first angle.

14. The wireless device of claim 10, wherein the processor is further configured to:
    transmit a third carrier signal by the second antenna element of the second device;

receive the third carrier signal by the antenna of the first device; and determine a fourth phase estimate based on the third carrier signal received by the antenna of the first device, wherein determining the residual range between the first device and the second device is based on the first phase estimate, the second phase estimate, the third phase estimate, and the fourth phase estimate.

* * * * *